(12) United States Patent
Li et al.

(10) Patent No.: US 8,582,501 B2
(45) Date of Patent: *Nov. 12, 2013

(54) MULTIPLE ANTENNA MODE CONTROL METHOD BASED ON ACCESS POINT

(75) Inventors: Feng Li, Shenzhen (CN); Li Zhang, Shenzhen (CN); Bin Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 880 days.

This patent is subject to a terminal disclaimer.

(21) Appl. No.: 12/443,077

(22) PCT Filed: Sep. 18, 2007

(86) PCT No.: PCT/CN2007/002756
§ 371 (c)(1),
(2), (4) Date: May 15, 2009

(87) PCT Pub. No.: WO2008/037179
PCT Pub. Date: Apr. 3, 2008

(65) Prior Publication Data
US 2010/0046427 A1    Feb. 25, 2010

(30) Foreign Application Priority Data
Sep. 28, 2006  (CN) .......................... 2006 1 0113453

(51) Int. Cl.
*H04W 4/00* (2009.01)
(52) U.S. Cl.
USPC ........................................ 370/328; 455/450
(58) Field of Classification Search
None
See application file for complete search history.

(56) References Cited

U.S. PATENT DOCUMENTS

| 7,933,629 B2 * | 4/2011 | Kwon et al. ............... 455/562.1 |
| 2003/0125040 A1 * | 7/2003 | Walton et al. ................. 455/454 |
| 2005/0265281 A1 * | 12/2005 | Ketchum ...................... 370/328 |

(Continued)

FOREIGN PATENT DOCUMENTS

| CN | 1773885 A | 5/2006 |
| CN | 1780173 A | 5/2006 |
| WO | 2006006826 A1 | 1/2006 |
| WO | 2006098538 A1 | 9/2006 |

OTHER PUBLICATIONS

P.R. China, State Intellectual Property Office, International Search Report for International Application No. PCT/CN2007/002756, mailed Dec. 6, 2007.

(Continued)

*Primary Examiner* — Bunjob Jaroenchonwanit
(74) *Attorney, Agent, or Firm* — Bright IP Law Offices

(57) ABSTRACT

A multiple antenna mode control method based on an Access Point comprises the following steps: step 1, the Access Point periodically sends out a multiple antenna mode set or subset supported by the Access Point (S101); step 2, the Station reports a multiple antenna mode set or subset supported by the Station or, reports a multiple antenna mode set or subset supported by both the Station and the Access Point to the Access Point (S105); step 3, a multiple antenna mode is chosen from a multiple antenna mode set or subset supported by both the Station and the Access Point for communicating (S110). As a result, the Station and the Access Point can communicate in a reliable or high-speed antenna mode supported by both sending and receiving sides, and thereby the error frame rate is reduced, and the network throughput is increased.

26 Claims, 4 Drawing Sheets

(56) References Cited

U.S. PATENT DOCUMENTS

| | | | |
|---|---|---|---|
| 2008/0192683 A1* | 8/2008 | Han et al. | 370/329 |
| 2008/0280619 A1* | 11/2008 | Chun et al. | 455/446 |
| 2009/0044065 A1* | 2/2009 | She et al. | 714/748 |

OTHER PUBLICATIONS

P.R. China, State Intellectual Property Office, First Office Action for CN App. No. 200610113453.0, dated Aug. 3, 2010.

* cited by examiner

MULTIPLE ANTENNA MODE CONTROL METHOD BASED ON ACCESS POINT

TECHNICAL FIELD

The present invention relates to a multiple antenna control technique in wireless communication field, more particularly to a multiple antenna mode control method based on Access Point (Base Station).

BACKGROUND OF THE INVENTION

In wireless communication system, multiple antenna techniques are commonly used. According to their basic principles, these techniques can be classified into three categories: spatial multiplexing, spatial diversity and beam forming.

The core idea of the spatial multiplexing technique lies in that a sending end and a receiving end respectively use a plurality of antennas arranged in proper positions or with different polarities to form a plurality of channels independent with each other between the sending end and the receiving end. As a result, the sending end can send different data to different channels and the receiving end can receive these data respectively to acquire greater spectral efficiency.

The core idea of the spatial diversity technique lies in that a transmitter and a receiver use a plurality of antennas arranged in proper positions or with different polarities to produce an independent fading channel. The sending end encodes a same signal and sends it to different channels to achieve the spatial diversity. Due to the employment of the coding technique, the spatial diversity technique can obtain some coding gain in addition to diversity gain.

The core idea of the beam forming technique lies in that a transmitter and a receiver use a plurality of antennas arranged in proper positions to enable the sending end and the receiving end to get channels with the same or similar fading characteristics. The difference among the different channels lies in different routes, according to which the receiving end can get the Direction of Arrivals (DOA) of a signal conveniently and processing gain can be obtained by adjusting the phase of the receiving antenna and making the array antennas point at the coming direction of the signal.

The spatial multiplexing technique is usually applicable to the condition of a good-quality channel; the spatial diversity technique is applicable to a complex environment of multipath fading; and the beam forming technique is applicable to an open and outdoor channel environment with a main path. However, due to the different basic principles employed respectively, it is difficult to use these three techniques in a multiple antenna system at the same time. Therefore, only one of the above three multiple antenna systems is usually applied in wireless communication system.

With people's increasing demand on wireless mobile services, it becomes a goal pursued by wireless communication system to acquire the greatest performance by different techniques in different scenarios. Therefore, a multiple antenna mode control method is in urgent need to enable wireless communication system to cover a mobile Station and an Access Point with the spatial multiplexing, the spatial diversity and the beam forming techniques at the same time, and to allow the sending and the receiving ends to select a suitable multiple antenna mode for transmitting data according to the specific channel environment.

SUMMARY OF THE INVENTION

To solve the above problems, the present invention provides a multiple antenna mode control method based on Access Point to construct a communication mode supported by different communication systems in a specified multiple antenna mode. Therefore, both the sending and receiving sides can make an adaptive selection of a suitable multiple antenna mode for data transmission.

The multiple antenna mode control method based on Access Point provided in the present invention includes the following steps: step 1, the Access Point periodically sends out a multiple antenna mode set or subset supported by the Access Point; step 2, a Station reports a multiple antenna mode set or subset supported by the Station, or reports a multiple antenna mode set or subset supported by both the Station and the Access Point, to the Access Point; and step 3, a multiple antenna mode is chosen from a multiple antenna mode set or subset supported by both the Station and the Access Point for communicating.

Step 1 further comprises: the Access point periodically sends a specific broadcast frame with information of the multiple antenna mode set or subset supported by the Access Point by broadcasting in a manner that the Station can analyze.

The multiple antenna mode set refers to all transmitting antenna modes and receiving antenna modes likely to be supported by the Access Point and the Station, the multiple antenna mode set supported by the Access Point refers to all transmitting antenna modes and receiving antenna modes supported by the Access Point, and the multiple antenna mode subset supported by the Access Point refers to part of the transmitting antenna modes and receiving antenna modes supported by the Access Point, wherein, each multiple antenna mode is determined according to the antenna numbers of both sending and receiving sides as well as a corresponding algorithm. The transmitting antenna modes and the receiving modes of a same Access Point are not peer-to-peer.

In Step 2, the Station reports to the Access Point the multiple antenna mode set or subset supported by the Station further comprises: after receiving the multiple antenna mode set or subset sent out by the Access Point, the Station acquires the valid multiple antenna mode set or subset supported by both the Station and the Access Point; and the Station reports to the Access Point multiple antenna mode information, which is configured by the Station according to the multiple antenna mode set or subset supported by the Station and carried in a specific frame.

In step 2, the Station reports to the Access Point the multiple antenna mode set or subset supported by both the Station and the Access Point further comprises: after receiving the multiple antenna mode set or subset sent out by the Access Point, the Station acquires the valid multiple antenna mode set or subset supported by both the Station and the Access Point and the Station reports to the Access Point the valid multiple antenna mode set or subset supported by both the Station and the Access Point.

Step 2 still further comprises: after the Station reports to the Access Point the multiple antenna mode set or subset supported by the Station, the Access Point returns to the Station an acknowledgement, in which the Access Point further emphasizes or restricts the multiple antenna mode set or subset likely or necessary to be employed for communicating between the Access Point and the Station according to the acquired multiple antenna mode set or subset supported by both the Station and the Access Point.

The multiple antenna mode set supported by the Station refers to all transmitting antenna modes and receiving antenna modes supported by the Station, and the multiple antenna mode subset supported by the Station refers to part of the transmitting antenna modes and receiving antenna modes supported by the Station, wherein each multiple antenna mode is determined according to the antenna numbers of both sending and receiving sides and a corresponding algorithm. The sending antenna modes and the receiving antenna modes by the same Station are not peer-to-peer.

Step 3 further comprises: with either the Station or the Access Point taken as a sending side, a multiple antenna mode is chosen form the multiple antenna mode set or subset supported by both the Station and the Access Point for broadcasting, multicasting or unicasting; the step of a multiple antenna mode is chosen from a multiple antenna mode set or subset supported by both the Station and the Access Point comprises: the sending side chooses a multiple antenna mode from the multiple antenna mode set or subset supported by both the Station and the Access Point, and sends the information of the multiple antenna mode been chosen to the receiving side in a manner that the receiving side can analyze; and the sending side sends data to be sent in the multiple antenna mode, while the receiving side receives and analyses the information, and receives the data in a corresponding multiple antenna mode thereafter.

In Step 3, the step of a multiple antenna mode is chosen from a multiple antenna mode set or subset supported by both the Station and the Access Point comprises: the sending side and the receiving side agree in advance on a multiple antenna mode of data to be sent, the sending side sends the data to be sent in the multiple antenna mode, while the receiving side receives the data in a corresponding multiple antenna mode, wherein the multiple antenna mode is one mode of the multiple antenna mode set or subset supported by both the Station and the Access Point.

Therefore, the present invention may solve the technical problems in the background techniques that do not support the selection of an optimal rate with multiple services available in the network and are not adaptive to wireless channels, especially wireless mobile channels in multiple application scenarios. Furthermore, based on multiple antenna capability information sent out by the Access Point in the present invention, a multiple antenna capability negotiation process is established between the Station and the Access Point, to construct a communication mode supported by different communication systems in a specified multiple antenna mode. Meanwhile, during the subsequent service transmission after the completion of the negotiation, the Station and the Access Point can communicate with each other in a reliable or high-speed multiple antenna mode supported by both the sending and receiving sides. Thereby, the error frame rate is reduced, and the network throughput is increased. Therefore, the present invention is particularly applicable to high-throughput wireless communication systems.

Additional features and advantages of the invention will be set forth in the description given below and will partly become apparent upon examination of the following description or may be understood from practice of the invention. The objectives and other advantages of the invention may be realized and attained by the structure particularly pointed out in the written description and claims hereof as well as the appended drawings.

BRIEF DESCRIPTIONS OF THE DRAWINGS

The appended drawings intend to help further understanding of the invention, and constitute part of the description. They are used to explain the invention together with the embodiments, and shall not be construed as limitations on the invention. In the appended drawings.

DETAILED DESCRIPTION OF THE PREFERRED EMBODIMENTS

With reference to the drawings above, a description of the preferred embodiments is to be given below. It is to be understood that the preferred embodiments herein intend only to describe and explain the invention, not to limit the invention.

Figure 1:
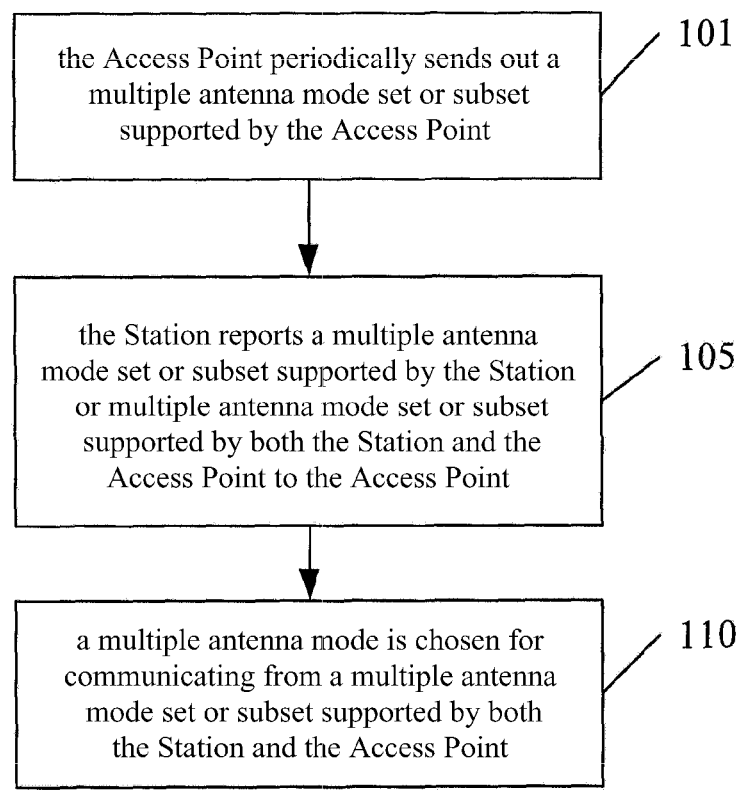
FIG. 1 is a flow chart of the multiple antenna control method in Wireless Local Area Network (WLAN) of the invention's embodiment.

FIG. 1 is a flow chart of the multiple antenna control method in WLAN of the invention's embodiment. As illustrated in FIG. 1, a Station (STA) reports a multiple antenna mode set or subset supported by the Station to an Access Point (AP); the Access Point returns a multiple antenna mode set or subset supported by the Access Point to the Station, or returns a multiple antenna mode set or subset supported by both the Station and the Access Point to the Station; a multiple antenna mode is chosen from the multiple antenna mode set supported by both the Station and the Access Point for communicating.

As shown in FIG. 1, the method for data transmission in WLAN of the embodiment includes the following steps:

S101, the Access Point periodically sends out a multiple antenna mode set or subset supported by itself;

More exactly, the Access Point configure multiple antenna mode information according to the multiple antenna mode set or subset supported by itself, and read the configuration result in an multiple antenna mode subfield of capability information field in a specific broadcast frame (e.g. a beacon frame). The Access Point sends out to the Station the multiple antenna mode set or subset supported by the Access Point through periodical broadcasting of the broadcast frame.

Wherein, the multiple antenna mode information comprises information that can exclusively determine the multiple antenna mode; for example, the information could be transmission rate information, which is usually a combination of modulation mode, coding mode and antenna mode in practice. Through the transmission rate information, the multiple antenna mode supporting the transmission rate can be exclusively determined.

The specific broadcast frame (e.g. a beacon frame) is analyzable to all Stations in systems of the same kind.

The multiple antenna mode set comprises multiple antenna mode sets comprising of all transmitting antenna modes and receiving antenna modes likely to be supported by all Stations and the Access Point, agreed in advance according to a communication protocol, wherein each multiple antenna mode is determined by antenna numbers of both sending side and receiving side as well as a corresponding algorithm, and the number of the multiple antenna mode sets is countable NA.

The multiple antenna mode set or subset supported by the Access Point comprises the multiple antenna mode sets supported by the Access Point and the multiple antenna mode subsets supported by the Access Point, wherein each multiple antenna mode is determined by the antenna numbers of both sending and receiving sides as well as a corresponding algorithm.

The multiple antenna mode set supported by the Access Point refers to all of the transmitting antenna modes and receiving antenna modes supported by the Access Point.

The multiple antenna mode subset supported by the Access Point refers to part of the transmitting antenna modes and receiving antenna modes supported by the Access Point. For example, if the Station supports N(N≤NA) modes, the N modes constitute the multiple antenna mode set supported by the Access Point. According to application scenarios or specific configurations, the Access Point only reports M (M≤N) modes supported by the Access Point, and information of the M modes is called the multiple antenna mode subset information supported by the Access Point.

The transmitting antenna modes and the receiving antenna modes of a same Access Point could be not peer-to-peer. For example, the Access Point supports a selective combining sending of 2 antennas during sending, but a space-time code receiving of 2 antennas during receiving.

The step includes: the Access Point periodically sends a broadcast frame with information of the multiple antenna mode set or subset supported by the Access Point through broadcasting, in a manner the Station can analyze.

S105, the Station reports multiple antenna mode set or subset supported by the Station or multiple antenna mode set or subset supported by both the Station and the Access Point to the Access Point;

More exactly, after receiving the specific broadcast frame (such as a beacon frame) sending by the Station, the Station acquires the multiple antenna mode set or subset supported by the Access Point through analyzing the antenna mode subfield of the specific broadcast frame. The Station configures the multiple antenna mode information according to the multiple antenna mode set or subset supported by the Station, and reads the configuration result in the multiple antenna mode subfield of capability information field of the specific broadcast frame. Through sending the specific broadcast frame, the multiple antenna mode set or subset supported by the Station is reported to the Access Point.

The multiple antenna mode set or subset supported by the Station comprises the multiple antenna mode set supported by the Station and the multiple antenna mode subset supported by the Station, wherein each antenna mode is determined by the antenna numbers of both sending and receiving sides as well as a corresponding algorithm.

The multiple antenna mode set supported by the Station refers to all of the transmitting antenna modes and receiving antenna modes supported by the Station.

The multiple antenna mode subset supported by the Station refers to part of the transmitting antenna modes and receiving antenna modes supported by the Station. For example, if the Station supports n (n≤NA) modes, the n modes constitute the multiple antenna mode set supported by the Station. According to application scenarios or specific configurations, the Station only reports m (m<n) modes supported by the Station, and information of the m modes is called the multiple antenna mode subset information supported by the Station.

The receiving antenna mode could be unequal to the transmitting antenna mode of the same Station. For example, the Station supports a space-time code sending of 2 antennas during sending, but a selective combining receiving of 2 antennas during receiving.

The step of the Station reports to the Access Point the multiple antenna mode set or subset supported by the Station, further includes: After receiving the multiple antenna mode set or subset sent out by the Access Point, the Station acquires multiple antenna mode set or subset supported by both the Station and the Access Point, and reports to the Access Point multiple antenna mode information carried by a specific frame (e.g. an association request frame) and configured by the Station according to the multiple antenna mode set or subset supported by the Station.

The step of the Station reports to the Access Point the multiple antenna mode set or subset supported by both the Station and the Access Point, further includes: after receiving the multiple antenna mode set or subset sent out by the Access Point, the Station acquires valid multiple antenna mode set or subset supported by both the Station and the Access Point, and reports to the Access Point the valid multiple antenna mode set or subset supported by both the Station and the Access Point.

There are two ways for the Station to configure the multiple antenna mode information according to the multiple antenna mode set or subset supported by the Station. One is to configure an antenna mode subfield with the multiple antenna mode set or subset supported by the Station; and the other is to configure an antenna mode subfield with the multiple antenna mode set or subset supported by both the Station and the Access Point.

After the Station reports to the Access Point the multiple antenna mode set or subset supported by the Station, the Access Point may either return or not return an acknowledgement; in the returned acknowledgement, the Access Point may further emphasize or restrict the multiple antenna mode set or subset likely or necessary to be employed for communication between the Access Point and the Station, according to the acquired multiple antenna mode set or subset supported by both the Station and the Access Point.

The significance of the above-mentioned emphasis or restriction lies in that the Station and the Access Point can acquire the mutually supported multiple antenna modes through the first half of the negotiation. At this moment, the Station narrows again the scope of the multiple antenna modes, selecting coercively several some multiple antenna modes from the multiple antenna modes supported by both the Station and the Access Point for further restriction. If no restriction is conducted, it is considered to be emphasis.

S110, a multiple antenna mode is chosen for communicating from a multiple antenna mode set or subset supported by both the Station and the Access Point.

The step further includes: with either the Station or the Access Point as an sending side, a multiple antenna mode is chosen from the multiple antenna mode set or subset supported by both the Station and the Access Point for broadcasting, multicasting or unicasting.

The step of selecting a multiple antenna mode from the multiple antenna mode set or subset supported by both the Station and the Access Point could be: a sending side selects a multiple antenna mode from the multiple antenna mode set or subset supported by both the Station and the Access Point, and sends its mode information in a manner the receiving side could analyze, to be followed immediately by data to be sent in the multiple antenna mode. The receiving side first analyzes the mode information, and then receives the data from the sending side in a corresponding mode.

The step of selecting a multiple antenna mode from the multiple antenna mode set or subset supported by both the Station and the Access Point could also be: sending and receiving sides agree in advance a multiple antenna mode, which is one of the multiple antenna set or subset supported by both the Station and the Access Point of data to be sent. And then, the sending side sends the data to be sent in the mode hereof, while the receiving side receives the data in a corresponding mode.

More specifically, two methods are employed to realize the step.

The first method: when there are data to be transmitted, a sending side, either the Station or the Access Point, selects a multiple antenna mode, with consideration of either or both of the two elements, the current channel quality condition and the demand on Quality of Service (QoS) of the data to be sent. During the sending process, the sending side first writes the multiple antenna mode in a field related to the antenna information of a physical frame header. The format of the physical frame for sending data consists of two parts: the first part is a physical frame header sending in a basic rate, i.e. the most reliable transmission rate, and analyzable whether the receiving side supports the multiple antenna mode or not; a second part is the transmission data sent in the multiple antenna mode. The receiving side is able to receive and analyze the physical frame header and acquire the multiple antenna mode employed by the subsequent sent data from the field related to antenna information in the physical frame header. The receiving end receives the sent data in a corresponding multiple antenna mode thereafter.

The field related to antenna information could simply be the antenna mode information, or mapping information of the antenna mode and modulating mode and coding mode.

The second method: first, a connection is established between the Station and the Access Point in a way that either the Station or the Access Point first sends a connection request, in which a multiple antenna mode supported by both the sending and receiving sides is assigned, and the other side gives a response acknowledgement. After the connection is established, if either one of the Station and the Access Point has transmission data matching the connection, it can send the transmission data in a corresponding multiple antenna mode, while the other can receive in a corresponding multiple antenna mode. A plurality of connections can be established between the Station and the Access Point and multiple antenna mode of each connection could either be the same or not.

When selecting a multiple antenna mode, the sending side may consider either or both of the two elements of the current channel quality condition and the demand on QoS of the data to be sent, wherein the element of current channel quality condition may be considered in view of previous experience or the statistics and measurement of recent or current transmission condition. At the first sending a selected multiple antenna mode to a specific receiving end, the selected multiple antenna mode can be chosen from the multiple antenna mode set or subset supported by both the Station and the Access Point, transmitted in the maximum rate, the most reliable rate, or a middle rate of the two rates.

Thereby, the multiple antenna control method in WLAN of the present embodiment can employ different multiple antenna modes according to the channel condition and the demand of data on QoS, to adapt to changes of channel quality caused by mobility or other factors.

Figure 2A:
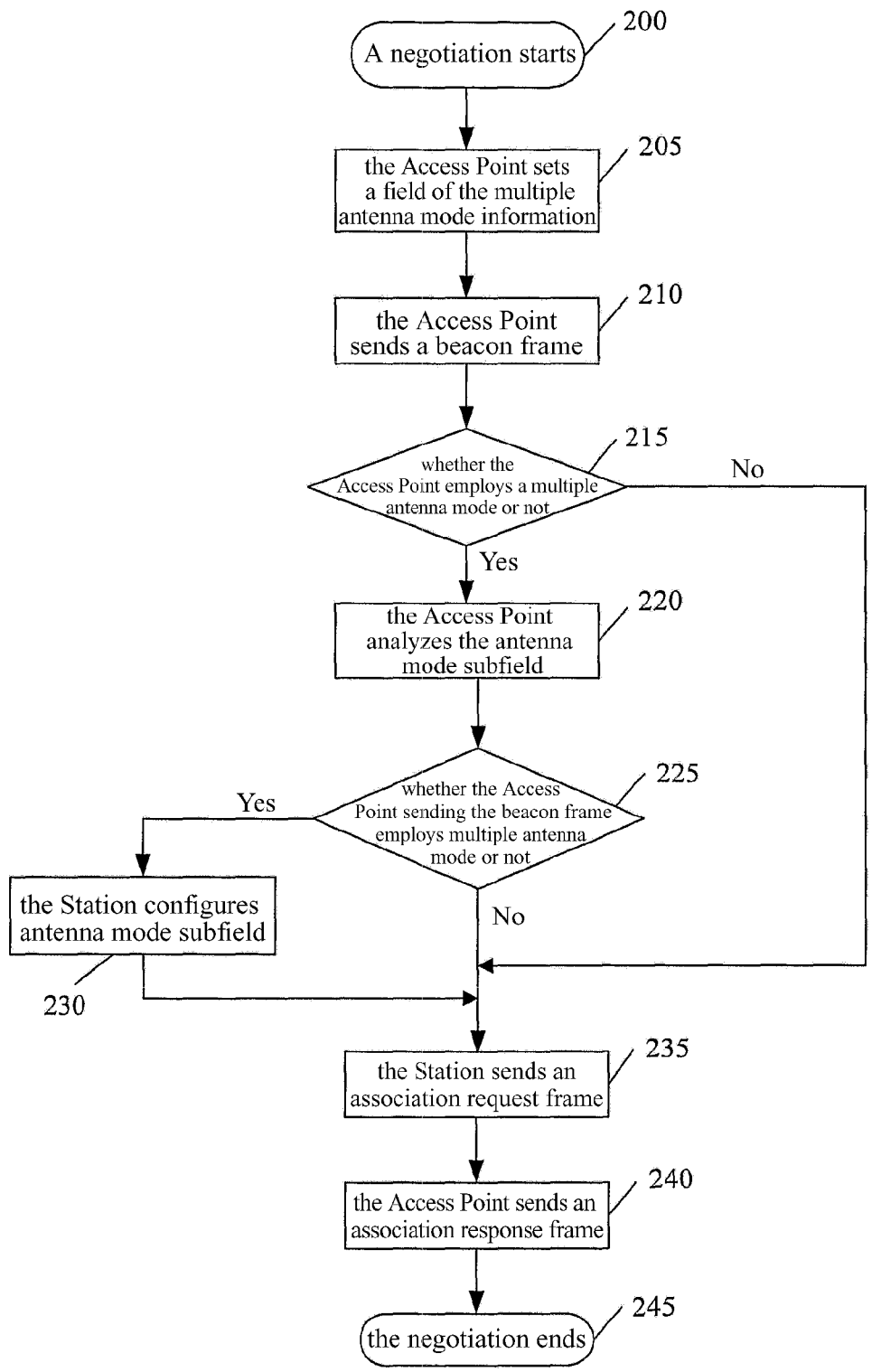
FIG. 2A-FIG. 2C is a detailed flow chart showing the multiple antenna control method in Wireless Local Area Network of one of the invention's embodiments.
Figure 2B:
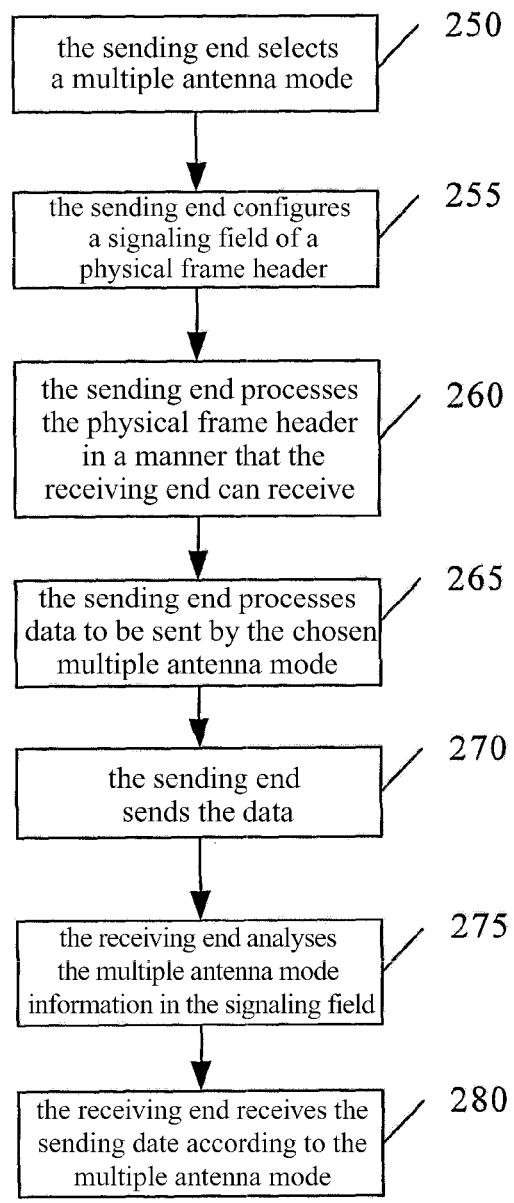
Figure 2C:
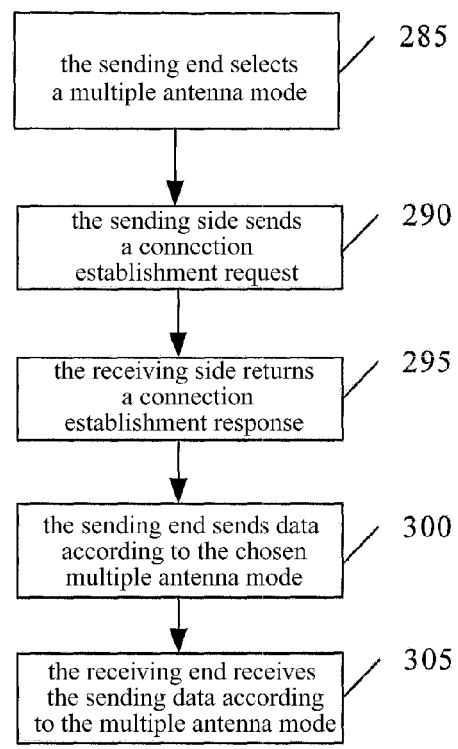
Figure 3A:
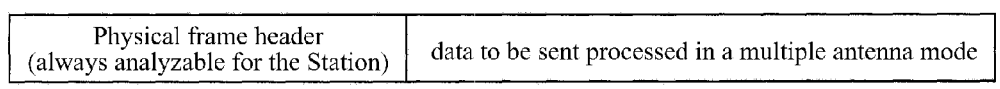
FIG. 3A-FIG. 3B shows the format of a physical frame of a return frame in one of the invention's embodiments.
Figure 3B:
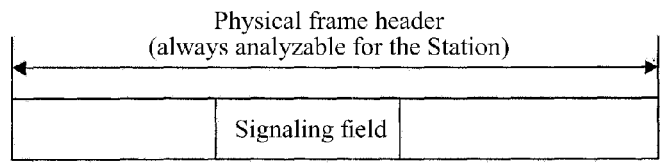

FIG. 2A-FIG. 2C are detailed flow charts showing the multiple antenna mode in Wireless Local Area Network of one of the invention's embodiments. FIG. 3A and FIG. 3B show the format of a physical frame of a return frame in one of the invention's embodiments. Now with reference to the above drawings, a description of the preferred embodiments is to be given below.

As shown in FIG. 2, the flow comprises:

S200, a negotiation starts;

S205, the Access Point sets the multiple antenna mode information in a beacon frame;

In the present embodiment, there are all together NA multiple antenna modes, respectively M0~MNA, wherein M0, the corresponding transmission rate of which is R0~RNA means not to use the multiple antenna mode or not to support the multiple antenna mode. In the present embodiment, NA bits being taken to indicate the subfield of a transmission rate, if the i (0≤i≤NA) bit is "1", it indicates that the Station supports the Mi type transmission rate, corresponding to Mi type multiple antenna mode. For example, if the 2nd and the 7th bits of the subfield are "1", with other bits being "0", it indicates the Access Point supports both R2 and R7 transmission rates, and correspondingly, the Access Point supports both M2 and M7 multiple antenna modes. If bits of the subfield are all "0", it indicates basically transmits the rate set of the Access Point, i.e. the Access Point doesn't employ several specific transmission rates corresponding to the multiple antennas modes, and correspondingly, the Access Point does not support the multiple antenna modes, or supports the multiple antenna modes, but refuses to employ them. It may be specified more exactly in other bits of the capability information whether to support or employ the multiple antenna modes.

S210, the Access Point sends periodically the beacon frame in a format that the Station is able to receive, wherein the beacon frame carries an antenna mode subfield;

S215, it is judged whether the Station employs a multiple antenna mode or not; If the Station employs a multiple antenna mode, turn to S220, otherwise set all the antenna mode subfields to be "0", and turn to S235;

S220, the Station analyzes the antenna mode subfield in the beacon frame, and thereby acquires multiple antenna mode set or subset supported by the Access Point;

S225, it is judged whether the Access Point sending the beacon frame supports or employs multiple antenna mode or not according to the multiple antenna mode information. If the Access Point employs multiple antenna mode, turn to S230, otherwise configure the antenna mode subfield to be "0", and turn to S235;

S230, the Station configures antenna mode subfield of an association request frame according to multiple antenna mode set or subset supported by the Station; or according to the multiple antenna mode set or subset supported by the Access Point acquired by the Station in S220 and in combination with the multiple antenna mode set or subset supported by the Station, the Station sets the antenna mode subfield of the association request frame with the multiple antenna mode set or subset supported by both the Station and the Access Point;

S235, the Station sends the association request frame in a format that the Access Point is able to receive, wherein the association request frame carries the antenna mode subfield configured by the Station.

S240, the negotiation process will end with the Station's receiving an association response frame sent by the Access Point. The Access Point receives the association request frame, from which the Station will acquire the multiple antenna mode set or subset supported by both the Station and the Access Point, if the Station and the Access Point both employ multiple antenna mode, otherwise the Station reckons that the Station and the Access Point communicate with each other in non-multiple antenna mode. The Access Point sends the association response frame, in which the Access Point can further emphasize or restrict multiple antenna mode set or subset likely or necessary to be employed for communicating between the Access Point and the Station, according to the acquired multiple antenna mode set or subset supported by both the Station and the Access Point; and S245, the multiple antenna mode negotiation ends, after the Station receives the association response frame.

In the above S240, the sending and receiving sides can start a communication based on multiple antenna mode, which can be performed in two ways: the first is to be described by S250~S280, as shown in FIG. 2, and the second is to be described by S285~S305, as shown in FIG. 2C.

The flow of communication based on the first method includes the following steps:

S250, when there are data to be sent at the sending side/end, the sending side can select a multiple antenna mode from the multiple antenna mode set or subset supported by both the Station and the Access Point, and the selection method hereof is in accordance with either or both of the two elements—channel quality and demand on QoS of transmission data;

S255, the sending side configures a signaling field of a physical frame header, and writes the chosen multiple antenna mode information in the signaling field of the physical frame header, as shown FIG. 3B;

S260, the sending side processes the physical frame header in a manner that the receiving side can receive. For example, according to a previous agreement, error-correcting coding is conducted to all physical frame headers in 1/2 convolution code, and then BPSK (Binary Phase Shift Key) modulation is conducted thereto;

S265, the sending side processes data to be sent by the chosen multiple antenna mode. For example, the chosen multiple antenna mode is 2×2 Space-Time Block Coding, 64 QAM Modulating and 3/4 Convolution Coding;

Wherein, the QAM stands for Quadrature Amplitude Modulation.

S270, the sending side combines the physical frame header obtained in S260 with the processed data to be sent obtained in S265 in a format shown in FIG. 3A, and then sends them to the receiving side;

S275, the receiving side/end receives the data, finds the signaling field of the physical frame header according to the format shown in FIG. 3B, and analyzes the multiple antenna mode information; and S280, the receiving side analyzes transmission/sending data in a corresponding algorithm, according to the acquired multiple antenna mode information.

The flow of communication based on the second method includes the following steps:

S285, the sending side/end selects a multiple antenna mode;

More exactly, when the sending side has data to be sent, it can select the multiple antenna mode from the multiple antenna mode set or subset supported by both the Station and the Access Point, and take this mode as the multiple antenna mode information. The method for selecting a multiple antenna mode is in accordance with either or both of the two elements of channel quality and demand on QoS of transmission data; or the sending side may take either or both of the two pieces of information, channel quality and QoS standard of transmission data, as the multiple antenna mode information.

S290, the sending side sends a connection establishment request frame to the receiving side, wherein the frame carries the multiple antenna mode information;

S295, the receiving side/end returns a connection establishment response;

More exactly, after receiving the connection establishment request frame, the receiving side analyzes the multiple antenna mode information and determines a multiple antenna mode according to the information, by directly employing the multiple antenna mode specified in the multiple antenna mode information by the sending side, or by choosing a more suitable multiple antenna mode from the multiple antenna mode set or subset supported by both the sending and receiving ends. Moreover, a more suitable multiple antenna mode can also be decided according to channel quality and QoS standard of transmission data. Then, the decided multiple antenna mode is taken as the multiple antenna mode information, which is then written in the connection establishment response frame and returned to the receiving side;

S300, the sending end sends data according to the multiple antenna mode information in the connection establishment response frame; and S305, the receiving side receives the data according to the connected multiple antenna mode corresponding to the receiving data.

To sum up, the present invention may solve the technical problems inherent in the existing techniques that do not support the selection of an optimal rate with a plurality of services available in the network and are not adaptive to wireless channels, especially wireless high-speed mobile channels. Furthermore, based on the initiation of an Access Point, a multiple antenna capability negotiation process is established between the Station and the Access Point to construct a communication mode supported by different communication systems in a specified multiple antenna mode. Meanwhile, during the subsequent service transmission after the completion of the negotiation, the Station and the Access Point can communicate in a reliable or high-speed multiple antenna mode supported by both the sending and receiving sides. Thereby, the error frame rate is reduced, and the network throughput is increased. Therefore, the present invention is applicable to high-speed wireless communication systems.

Described above are only preferred embodiments of the present invention and shall not be construed as limitation the invention. It shall be understood by those skilled in the art that various alterations and changes may be made within the spirit and scope of the invention. All modifications, substitute, equivalents or improvement made therein is intended to be embraced in the claims of this invention.

What is claimed is:

1. A multiple antenna mode control method based on an Access Point, applicable to communication systems containing the Access Point and a Station, the method comprising:

the Access Point periodically broadcasting information about a multiple antenna mode set or subset supported by the Access Point;

upon receipt of the information from the Access Point, the Station reporting, to the Access Point, information about a multiple antenna mode set or subset supported by the Station or by both the Station and the Access Point; and the Access Point choosing one multiple antenna mode from the multiple antenna mode set or subset supported by both the Station and the Access Point and using the chosen multiple antenna mode to transmit data to the Station;

wherein each of the multiple antenna mode set or subset supported by the Access Point, the multiple antenna mode set or subset supported by the Station and the multiple antenna mode antenna modes selected from the group consisting of spatial multiplexing, spatial diversity and beam forming.

2. The of claim 1, wherein the periodically broadcasting further comprises: the Access point periodically broadcasting a specific broadcast frame with information of the multiple antenna mode set or subset supported by the Access Point by broadcasting the frame in a manner that the Station can analyze.

3. The method of claim wherein the multiple antenna mode set supported by both the Station and the Access Point refers to all transmitting antenna modes and receiving antenna modes supported by the Station and the Access Point; the multiple antenna mode set supported by the Access Point refers to all transmitting antenna modes and receiving antenna modes supported by the Access Point; the multiple antenna mode subset supported by the Access Point refers to part of the transmitting antenna modes and receiving antenna modes supported by the Access Point; and each multiple antenna mode is determined according to the antenna numbers of both sending and receiving sides as well as a corresponding algorithm.

4. The method of claim 1, wherein the transmitting antenna modes and the receiving antenna modes of a same Access Point are not peer-to-peer.

5. The method of claim 1, wherein the Station reporting further comprises: after receiving information about the multiple antenna mode set or subset broadcasted by the Access Point, the Station configuring a frame according to the multiple antenna mode set or subset supported by the Station and sending the frame to the Access Point, the frame including information about the multiple antenna mode set or subset supported by the Station.

6. The method of claim 1, wherein the Station reporting further comprises: after receiving information about the multiple antenna mode set or subset broadcasted by the Access Point, the Station configuring a frame according to the multiple antenna mode set or subset supported by both the Station and the Access Point and sending the frame to the Access Point, the frame including information about the multiple antenna mode set or subset supported by both the Station and the Access Point.

7. The method of claim 1, wherein the Station reporting further comprises: after the Station reports to the Access Point the multiple antenna mode set or subset supported by the Station, the Access Point returning to the Station an acknowledgement, in which the Access Point further emphasizes or restricts multiple antenna mode set or subset to be employed for communicating between the Access Point and the Station according to the multiple antenna mode set or subset supported by both the Station and the Access Point as determined by the Access Point.

8. The method of claim 1, wherein: the multiple antenna mode set supported by the Station refers to all transmitting antenna modes and receiving antenna modes supported by the Station; the multiple antenna mode subset supported by the Station refers to part of the 6 transmitting antenna modes and receiving antenna modes supported by the Station;
and wherein each multiple antenna mode is determined according to the antenna numbers of both sending and receiving sides as well as a corresponding algorithm.

9. The method of claim 1, wherein the transmitting antenna modes and the receiving antenna modes of a same Station are not peer-to-peer.

10. The method of claim 1, wherein the Access Point choosing further comprises: the Access Point choosing one multiple antenna mode from the multiple antenna mode set or subset supported by both the Station and the Access Point for broadcasting, multicasting or unicasting.

11. The method of claim 10, wherein: the Access Point sends the information of the chosen multiple antenna mode to the Station in a manner that the Station can analyze; and the Access Point sends data to be sent in the multiple antenna mode, while the Station receives and analyses the information, and receives the data in a corresponding multiple antenna mode thereafter.

12. The method of claim 10, wherein: the Access Point and the Station agree in advance on a multiple antenna mode for data transmission; and wherein the multiple antenna mode is one mode of the multiple antenna mode set or subset supported by both the Station and the Access Point.

13. The method of claim 2, wherein the Station reporting further comprises: after receiving information about the multiple antenna mode set or subset broadcasted by the Access Point, the Station configuring a frame according to the multiple antenna mode set or subset supported by the Station and sending the frame to the Access Point, the frame including information about the multiple antenna mode set or subset supported by the Station.

14. The method of claim 3, wherein the Station reporting further comprises: after receiving information about the multiple antenna mode set or subset broadcasted by the Access Point, the Station configuring a frame according to the multiple antenna mode set or subset supported b the Station and sending the frame to the Access Point, the frame including information about the multiple antenna mode set or subset supported by the Station.

15. The method of claim 4, wherein the Station reporting further comprises: after receiving information about the multiple antenna mode set or subset broadcasted by the Access Point, the Station configuring a frame according to the multiple antenna mode set or subset supported by the Station and sending the frame to the Access Point, the frame including information about the multiple antenna mode set or subset supported by the Station.

16. The method of claim 2, wherein the Access Point choosing further comprises: the Access Point choosing one multiple antenna mode from the multiple antenna mode set or subset supported by both the Station and the Access Point for broadcasting, multicasting or unicasting.

17. The method of claim 16, wherein: the Access Point sends the information of the chosen multiple antenna mode to the Station in a manner that the Station can analyze; and the Station receives and analyses the information, and receives the data in a corresponding multiple antenna mode thereafter.

18. The method of claim 16, wherein: the Access Point and the Station agree in advance on a multiple antenna mode for data transmission; and wherein the multiple antenna mode is one mode of the multiple antenna mode set or subset supported by both the Station and the Access Point.

19. the method of claim 3, wherein the Access Point choosing further comprises: the Access Point choosing one multiple antenna mode from the multiple antenna mode set or subset supported by both the Station and the Access Point for broadcasting, multicasting or unicasting.

20. The method of claim 19, wherein: the Access Point sends the information of the chosen multiple antenna mode to the Station in a manner that the Station can analyze; and the Station receives and analyses the information, and receives the data in a corresponding multiple antenna mode thereafter.

21. The method of claim 19, wherein: the Access Point and the Station agree in advance on a multiple antenna mode for data transmission; and wherein the multiple antenna mode is one mode of the multiple antenna mode set or subset supported by both the Station and the Access Point.

22. The method of claim 4, wherein the Access Point choosing further comprises: the Access Point choosing one multiple antenna mode from the multiple antenna mode set or subset supported by both the Station and the Access Point for broadcasting, multicasting or unicasting.

23. The method of claim 22, wherein: the Access Point sends the information of the chosen multiple antenna mode to the Station in a manner that the Station can analyze; and the Station receives and analyses the information, and receives the data in a corresponding multiple antenna mode thereafter.

24. The method of claim 22, wherein: the Access Point and the Station agree in advance on a multiple antenna mode for data transmission; and wherein the multiple antenna mode is one mode of the multiple antenna mode set or subset supported by both the Station and the Access Point.

25. A multiple antenna mode control method based on an Access Point, applicable to communication systems containing the Access Point and a Station, the method comprising:

the Access Point periodically broadcasting information about a multiple antenna mode set or subset supported by the Access Point;

upon receipt of the information from the Access Point, the Station reporting, to the Access Point, information about a multiple antenna mode set or subset supported by the Station or by both the Station and the Access Point based on the multiple antenna mode set or subset supported by the Access Point; and the Station choosing one multiple antenna mode from the multiple antenna mode set or subset supported by both the Station and the Access Point and using the chosen multiple antenna mode to transmit data to the Access Point;

wherein each of the multiple antenna mode set or subset supported by the Access Point, the multiple antenna mode set or subset supported by the Station and the multiple antenna mode set or subset supported by both the Station and the Access Point comprises a plurality of multiple antenna modes selected from the group consisting of spatial multiplexing, spatial diversity and beam forming.

26. The method of claim 25, further comprising:

upon receipt of the information from the Station, the Access Point sending to the Station information about a further restriction to the multiple antenna mode set or subset supported by both the Station and the Access Point; and the Station choosing one multiple antenna mode from the multiple antenna mode set or subset supported by both the Station and the Access Point in accordance with the further restriction provided by the Access Point.

* * * * *